United States Patent
Kim et al.

(10) Patent No.: US 12,541,242 B2
(45) Date of Patent: Feb. 3, 2026

(54) ELECTRONIC DEVICE AND METHOD FOR CONTROLLING ELECTRONIC DEVICE

(71) Applicant: Samsung Electronics Co., Ltd., Suwon-si (KR)

(72) Inventors: Heetae Kim, Suwon-si (KR); Soongyu Kwon, Suwon-si (KR); Minsu Kim, Suwon-si (KR); Sanghyun Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/348,757

(22) Filed: Jul. 7, 2023

(65) Prior Publication Data
US 2023/0350481 A1    Nov. 2, 2023

Related U.S. Application Data

(63) Continuation of application No. PCT/KR2021/020287, filed on Dec. 30, 2021.

(30) Foreign Application Priority Data

Jan. 11, 2021 (KR) .................. 10-2021-0003479
Apr. 27, 2021 (KR) .................. 10-2021-0054543

(51) Int. Cl.
  *G06F 1/324* (2019.01)
  *G06F 1/3215* (2019.01)
(52) U.S. Cl.
  CPC ............ *G06F 1/324* (2013.01); *G06F 1/3215* (2013.01)
(58) Field of Classification Search
  CPC ..... G06F 1/324; G06F 1/3215; G06F 11/3058
  See application file for complete search history.

(56) References Cited

U.S. PATENT DOCUMENTS

| 7,689,851 B2 | 3/2010 | Sawyers et al. |
| 9,240,683 B2 | 1/2016 | Tseng et al. |

(Continued)

FOREIGN PATENT DOCUMENTS

| CN | 208890340 U | * 5/2019 |
| JP | 2008-071149 A | 3/2008 |

(Continued)

OTHER PUBLICATIONS

International Search Report dated Apr. 4, 2022, issued in International Patent Application No. PCT/KR2021/020287.

(Continued)

*Primary Examiner* — Hyun Soo Kim
(74) *Attorney, Agent, or Firm* — Jefferson IP Law, LLP

(57) ABSTRACT

An electronic device is provided. The electronic device includes a battery, a power management module, a charging circuit, and a processor including a central processing unit (CPU) and a plurality of intellectual property (IP) blocks. The charging circuit is connected to the processor and includes a first pin to output a first overcurrent warning signal. The power management module is connected to the processor and includes a second pin to output a reset warning signal. The processor includes a first general purpose input output (GPIO) pin to receive the first overcurrent warning signal, and is configured to reduce at least one clock frequency among a plurality of clock frequencies set to each of the CPU and the plurality of IP blocks, or reduce at least one operation clock frequency of components inside the electronic device when the first overcurrent warning signal is received through the first GPIO pin.

20 Claims, 9 Drawing Sheets

(56) References Cited

U.S. PATENT DOCUMENTS

| | | | |
|---|---|---|---|
| 9,646,529 B2 | 5/2017 | Lee et al. | |
| 10,146,296 B2 | 12/2018 | Gainey et al. | |
| 10,211,656 B2 | 2/2019 | Zhang | |
| 10,461,561 B2 | 10/2019 | Zhang et al. | |
| 10,666,247 B2 | 5/2020 | Kim | |
| 10,734,832 B2 | 8/2020 | Wang | |
| 11,073,881 B2 | 7/2021 | Koshigaya | |
| 11,231,758 B2 | 1/2022 | Gomi et al. | |
| 11,262,823 B2 | 3/2022 | Kim et al. | |
| 11,268,990 B2 | 3/2022 | Khlat et al. | |
| 11,342,765 B2 | 5/2022 | Zhang | |
| 11,545,843 B2 | 1/2023 | Zhang et al. | |
| 12,164,370 B2* | 12/2024 | Chaudhari | G06F 1/28 |
| 2006/0227123 A1* | 10/2006 | Bychkov | H05K 5/0278 |
| | | | 345/204 |
| 2011/0148383 A1* | 6/2011 | Mullen | H02J 7/00714 |
| | | | 323/299 |
| 2012/0110351 A1* | 5/2012 | Raju | G06F 1/3296 |
| | | | 713/300 |
| 2013/0088803 A1* | 4/2013 | Kim | H05K 7/122 |
| | | | 361/93.7 |
| 2013/0232357 A1 | 9/2013 | Nagata et al. | |
| 2013/0345892 A1* | 12/2013 | Lin | H03K 19/00369 |
| | | | 700/299 |
| 2014/0068299 A1 | 3/2014 | Koinuma et al. | |
| 2015/0149807 A1* | 5/2015 | Yen | G06F 1/324 |
| | | | 713/340 |
| 2015/0248135 A1* | 9/2015 | Han | G05F 1/462 |
| | | | 307/31 |
| 2016/0066280 A1* | 3/2016 | Heo | H04W 52/0287 |
| | | | 455/574 |
| 2016/0070327 A1* | 3/2016 | Nemani | G06F 1/3206 |
| | | | 713/300 |
| 2016/0252939 A1 | 9/2016 | Bang et al. | |
| 2019/0064892 A1 | 2/2019 | Kim et al. | |
| 2019/0222039 A1* | 7/2019 | Liu | H02J 7/0029 |
| 2020/0366079 A1* | 11/2020 | Telefus | H01H 71/24 |
| 2021/0157390 A1* | 5/2021 | Yardi | G06F 3/014 |
| 2022/0107674 A1 | 4/2022 | Kim et al. | |
| 2022/0216706 A1 | 7/2022 | Zhang | |
| 2023/0297157 A1* | 9/2023 | Jin | G06F 1/324 |
| | | | 713/322 |
| 2024/0088680 A1* | 3/2024 | Kim | H02J 7/00712 |

FOREIGN PATENT DOCUMENTS

| | | | |
|---|---|---|---|
| JP | 2010-507869 A | 3/2010 | |
| JP | 2014-048972 A | 3/2014 | |
| JP | 2014-115648 A | 6/2014 | |
| JP | 2015-089328 A | 5/2015 | |
| JP | 2018-506188 A | 3/2018 | |
| JP | 2019-128761 A | 8/2019 | |
| JP | 2020-106918 A | 7/2020 | |
| KR | 10-2007-0071672 A | 7/2007 | |
| KR | 10-2009-0074809 A | 7/2009 | |
| KR | 10-2018-0037774 A | 4/2018 | |
| KR | 10-2019-0021663 A | 3/2019 | |
| KR | 10-2019-0071481 A | 6/2019 | |
| RU | 2704726 C1 | 10/2019 | |

OTHER PUBLICATIONS

Extended European Search Report dated May 21, 2024, issued in European Patent Application No. 21917959.5.
Indian Office Action dated Feb. 11, 2025, issued in an Indian Patent Application No. 202317050619.
European Office Action dated on May 16, 2025, issued in a European Patent Application No. 21917959.5.
Russian Office Action dated May 19, 2025, issued in a Russian Patent Application No. 2023120851.
Korean Office Action dated on Dec. 1, 2025, issued in a Korean Patent Application No. 10-2021-0054543.
Japanese Office Action dated Sep. 30, 2025, issued in a Japanese Patent Application No. 2023-541828.
Vietnamese Office Action dated Dec. 12, 2025, issued in Vietnamese Patent Application No. 1-2023-04508.

* cited by examiner

ELECTRONIC DEVICE AND METHOD FOR CONTROLLING ELECTRONIC DEVICE

CROSS-REFERENCE TO RELATED APPLICATION(S)

This application is a continuation application, claiming priority under § 365(c), of an International application No. PCT/KR2021/020287, filed on Dec. 30, 2021, which is based on and claims the benefit of a Korean patent application number 10-2021-0003479, filed on Jan. 11, 2021, in the Korean Intellectual Property Office, and of a Korean patent application number 10-2021-0054543, filed on Apr. 27, 2021, in the Korean Intellectual Property Office, the disclosure of each of which is incorporated by reference herein in its entirety.

BACKGROUND

1. Field

The disclosure relates to an electronic device and a method of controlling the electronic device.

2. Description of Related Art

A function for protecting an electronic device may be applied to the electronic device such as a portable terminal. When a current having a specified value or above flows through an electronic device or when a voltage of a battery of the electronic device is equal to or lower than a specified value, the circuit and/or battery of the electronic device may be damaged. To protect the circuit and/or battery of an electronic device, an over current protection (OCP) function and/or a sudden momentary power loss (SMPL) reset function may be applied. The overcurrent protection function may include a function of blocking the power supplied to the electronic device to turn off the electronic device when a current greater than a specified value flows through the electronic device. The SMPL reset function may include a power-off function of turning off the electronic device when the voltage of the battery of the electronic device is equal to or less than a specified value.

The above information is presented as background information only to assist with an understanding of the disclosure. No determination has been made, and no assertion is made, as to whether any of the above might be applicable as prior art with regard to the disclosure.

SUMMARY

When the overcurrent protection function or the SMPL reset function is performed while the electronic device is operating, the power is turned off while the electronic device is operating, thereby causing inconvenience to the user while using the electronic device. A function of reducing the operation of the overcurrent protection function and/or a function of reducing the operation of the SMPL reset function may be included in order to reduce a power-off phenomenon during operation of the electronic device. When the electronic device controls only a central processing unit through the function of reducing the operation of the overcurrent protection function and/or the function for reducing the operation of the SMPL reset function, due to an overcurrent protection function or SMPL reset function performed by a module other than the central processing unit of a processor and/or a module other than the processor, power of the electronic device may be turned off, resulting in reduced usability.

Aspects of the disclosure are to address at least the above-mentioned problems and/or disadvantages and to provide at least the advantages described below. Accordingly, an aspect of the disclosure is to provide an electronic device that controls various modules of the electronic device to prevent the electronic device from being turned off due to operations of an overcurrent protection function and/or an SMPL reset function, thereby improving use stability, and a method of controlling the electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a battery, a charging circuit, and a processor operationally connected to the battery and the charging circuit and including a central processing unit (CPU) and a plurality of intellectual property (IP) blocks, wherein the charging circuit includes a first pin configured to output a first overcurrent warning signal when a value of current flowing through the electronic device is greater than or equal to a first threshold current, wherein the processor includes a first general purpose input output (GPIO) pin configured to receive the first overcurrent warning signal output from the first pin, and wherein the processor is configured to reduce at least one clock frequency among a plurality of clock frequencies set to each of the CPU and the plurality of IP blocks, reduce luminance of a display controlled by the processor, or reduce a charging current of a power transmission module controlled by the processor when the first overcurrent warning signal is received through the first GPIO pin.

In accordance with another aspect of the disclosure, a system on chip (SoC) is provided. The SoC includes a processor, wherein the processor includes a first general purpose input output pin configured to receive a first overcurrent warning signal when a current level of an entire electronic device is greater than or equal to a first threshold current, and wherein the processor is configured to perform at least one of reducing a clock frequency of a central processing unit included in the processor, reducing luminance of a display controlled by the processor, or reducing a charging current of a power transmission module controlled by the processor according to the first overcurrent warning signal.

In accordance with another aspect of the disclosure, a method of controlling an electronic device is provided. The method includes determining, by a charging circuit of the electronic device, whether current consumed by the electronic device is greater than or equal to a first threshold current, setting, by the charging circuit, a first overcurrent warning signal based on the consumed current, outputting, by the charging circuit, the first overcurrent warning signal by using a first pin, receiving, by a processor of the electronic device, the first overcurrent warning signal through a first general purpose input output pin included in the processor, reducing, by the processor, a clock frequency of a central processing unit included in the processor and starting a timer, and reducing, by the processor, at least one of maximum clock frequencies of a plurality of IP blocks included in the processor, luminance of a display of the electronic device and a charging current of a power transmission module of the electronic device based on elapse of the timer.

According to the embodiments of the disclosure, SMPL reset may be reduced by reducing the voltage level drop of the battery and maintaining the voltage level of the battery higher than the value at which the SMPL reset occurs. Accordingly, the use stability of the electronic device may be improved by reducing a phenomenon in which the electronic device is turned off while the electronic device is in use.

In addition, according to the embodiments of the disclosure, SMPL reset may be reduced even when the voltage of the battery is maintained below a specified value in a low-temperature environment.

In addition, according to the embodiments of the disclosure, as current flowing through other blocks other than the central processing unit in the processor and/or other components of the electronic device such as a display, increases, even when the voltage drop increases so that the voltage of the battery drops below a specified value, the SMPL reset may be reduced.

In addition, various effects that are directly or indirectly understood through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
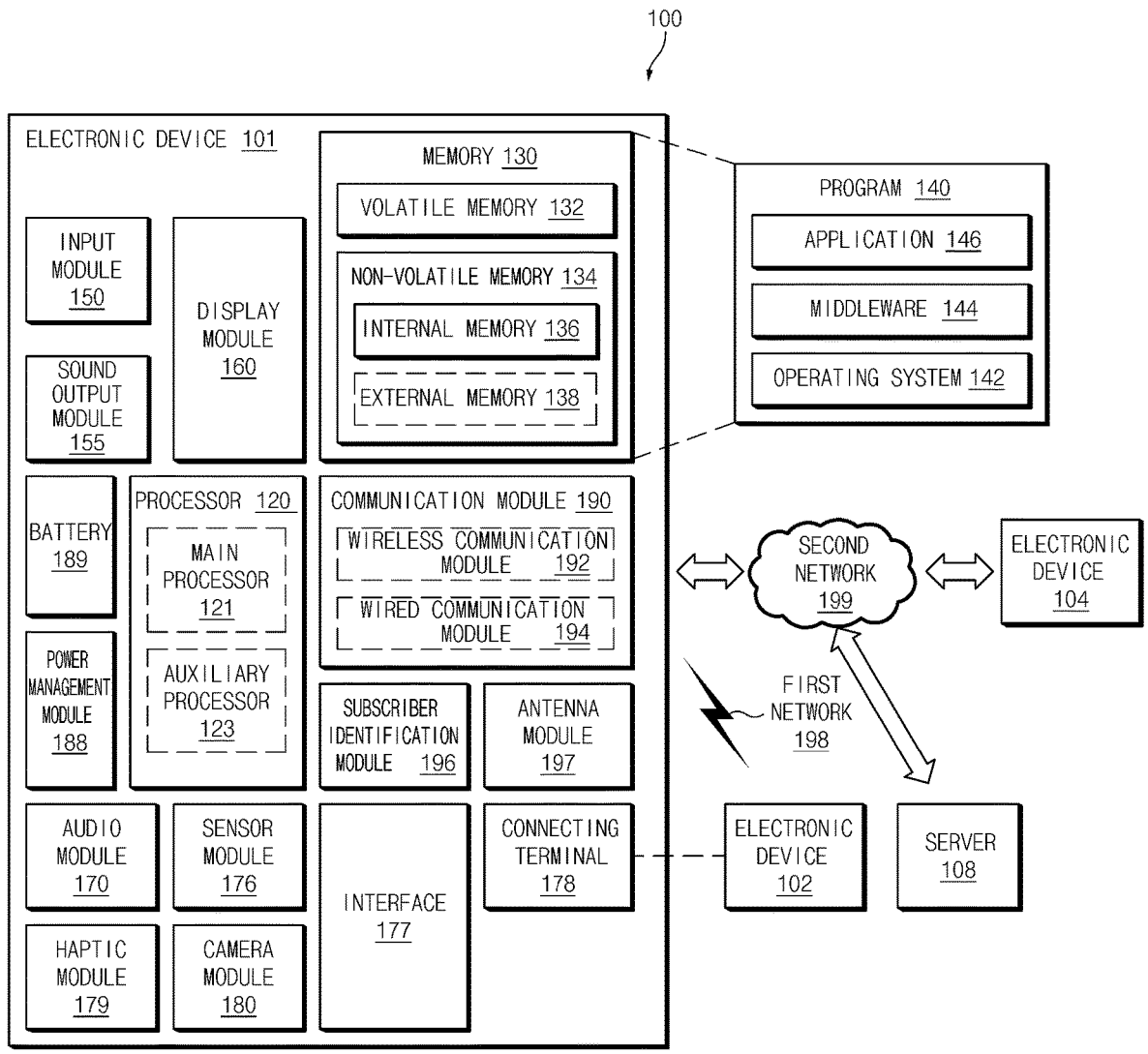
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
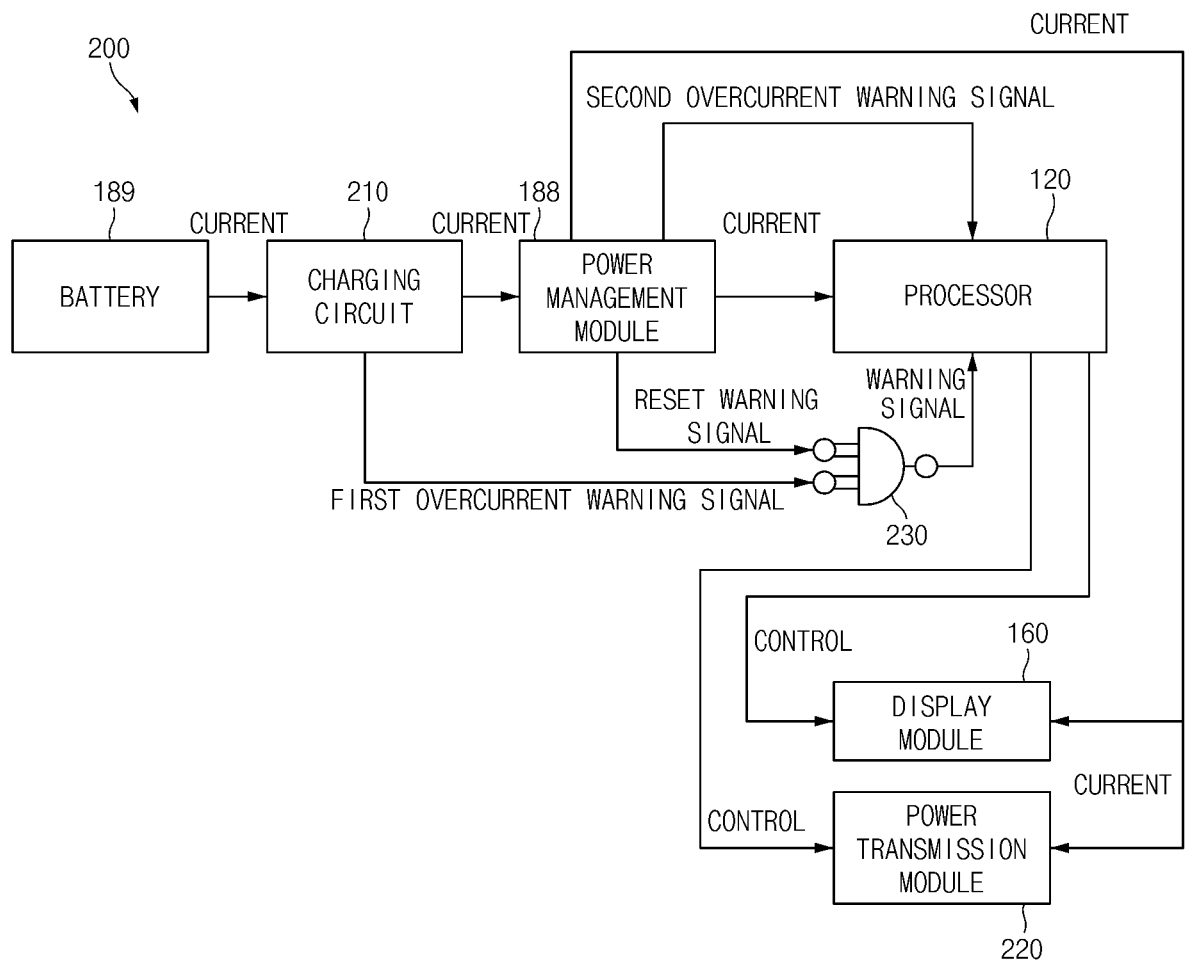
FIG. 2A is a block diagram illustrating an electronic device according to an embodiment of the disclosure.

FIG. 2A is a block diagram illustrating an electronic device (e.g., the electronic device 101 of FIG. 1) according to an embodiment of the disclosure.

Referring to FIG. 2A, the electronic device 101 may include the battery 189, a charging circuit 210, the power management module 188, and the processor 120. The charging circuit 210 and the power management module 188 may be configured as separate chips that are different from each other. In another embodiment, the charging circuit 210 and the power management module 188 may be configured as a single chip.

The battery 189 may transmit current to the charging circuit 210. The charging circuit 210 may include a circuit for charging the battery 189. The charging circuit 210 may include an intermediate frequency power management integrated circuit (IF PMIC).

The charging circuit 210 may receive current from the battery 189. The charging circuit 210 may measure the magnitude of the received current. The charging circuit 210 may transmit current to the power management module 188. The charging circuit 210 may control the magnitude and/or output timing of the received current and transmit the current to the power management module 188.

The charging circuit 210 may transmit a first overcurrent warning signal to a first logic circuit 230. The first overcurrent warning signal may be a signal generated by the charging circuit 210 to warn the electronic device 101 of the flow of a first threshold current capable of performing an overcurrent protection (OCP) function. The OCP function may be a function of turning off the electronic device by cutting off power supplied to the electronic device when a current greater than or equal to the first threshold current flows through the electronic device 101. The first threshold current may be about 6.2A. The first overcurrent warning signal may be collectively referred to as an OCP_WARN_Charger signal. The charging circuit 210 may perform the OCP function when the total current flowing through the electronic device 101 is equal to or greater than the first threshold current for the first threshold time. The first threshold time may be about 100 ms. The charging circuit 210 may output the first overcurrent warning signal to the power management module 188 when the total current flowing through the electronic device 101 is greater than or equal to the first threshold current for a second threshold time. The second threshold time may be shorter than the first threshold time. For example, the second threshold time may be about 3 ms.

The power management module 188 may supply current to the processor 120. The power management module 188 may include an application processor power management integrated circuit (AP PMIC). The power management module 188 may supply a current for operating the processor 120.

The power management module 188 may supply a current to the display module 160. The power management module 188 may supply a current for operating the display module 160. The power management module 188 may supply a driving current for driving pixels disposed on the display module 160 such that the display module 160 displays a screen.

The power management module 188 may supply a current to a power transmission module 220. The power transmission module 220 may transmit power to an external device such as another electronic device. For example, the power transmission module 220 may perform a power sharing function. For example, the power transmission module 220 may include an on the go (OTG) connection unit. The power management module 188 may supply a current for operating the power transmission module 220. The power management module 188 may supply a charging current for the power transmission module 220 to charge an external device such as another electronic device.

The power management module 188 may transmit a second overcurrent warning signal to the processor 120. The second overcurrent warning signal may be a signal generated by the power management module 188 to warn the electronic device 101 that a condition for performing the OCP function is satisfied. The second overcurrent warning signal may be collectively referred to as an OCP_WARN_CPU Buck signal. The power management module 188 may output a second overcurrent warning signal when the total current flowing through the electronic device 101 is equal to or greater than the second threshold current. The second threshold current may be different from the first threshold current. For example, the second threshold current may have a higher value than the first threshold current. Because the first overcurrent warning signal is the current related to the voltage of the battery 189 and the second overcurrent warning signal is the current at the buck voltage of the central processing unit, in terms of power, the power by the first threshold current may have a higher value than the power by the second threshold current. The power management module 188 may output the second overcurrent warning signal when the total current flowing through the electronic device 101 is greater than or equal to the second threshold current for a third threshold time. The third threshold time may be different from the first threshold time and the second threshold time.

The power management module 188 may transmit a reset warning signal to the first logic circuit 230. The reset warning signal may be a signal generated by the power management module 188 to warn that the electronic device 101 is close to a condition in which a sudden momentary power loss (SMPL) reset function can be performed. The SMPL reset function may be one of power off functions of turning off the electronic device when the voltage of the battery 189 of the electronic device 101 is equal to or less than the first threshold voltage. The reset warning signal may be collectively referred to as an SMPL_WARN signal. When the voltage of the power management module 188 is equal to or lower than the second threshold voltage, the power management module 188 may determine that the voltage of the battery 189 is equal to or lower than the second threshold voltage and output the reset warning signal. The second threshold voltage may be greater than the first threshold voltage. Accordingly, when the voltage of the battery 189 reaches the second threshold voltage before reaching the first threshold voltage, the reset warning signal is output to prevent the SMPL reset function from being performed.

The first logic circuit 230 may receive the first overcurrent warning signal and the reset warning signal. The first logic circuit 230 may include a logic gate to selectively process the first overcurrent warning signal and the reset warning signal or to process them together. For example, the first logic circuit 230 may be an OR gate. As another example, the first logic circuit 230 may be an AND gate. The first logic circuit 230 may generate a warning signal based on the first overcurrent warning signal and the reset warning signal. The warning signal may be a signal warning that the power of the electronic device 101 may be turned off to protect the electronic device 101. The first logic circuit 230 may transmit the warning signal to the processor 120.

The processor 120 may control the operation of a plurality of intellectual property (IP) blocks included in the processor 120. The plurality of IP blocks may include at least two of a central processing unit (CPU), a graphics processing unit (GPU), a neural processing unit (CPU), and a bus. When receiving the warning signal or the second overcurrent warning signal, the processor 120 may control a driving frequency of a clock that drives each of the plurality of IP blocks. For example, when receiving a warning signal or a second overcurrent warning signal, the processor 120 may decrease an operation clock frequency set in each of the plurality of IP blocks through dynamic voltage frequency scaling (DVFS).

The processor 120 may control the operation of the display module 160. The processor 120 may control the current supplied to the display module 160 when receiving the warning signal or the second overcurrent warning signal. For example, when receiving the warning signal or the second overcurrent warning signal, the processor 120 may reduce the current supplied to the display module 160 by reducing the luminance of a screen of the display module 160.

The processor 120 may control the operation of the power transmission module 220. The processor 120 may control the current supplied to the power transmission module 220 when receiving the warning signal or the second overcurrent warning signal. For example, when receiving the warning signal or the second overcurrent warning signal, the processor 120 may reduce the current supplied to the power transmission module 220 by reducing the rate at which the power transmission module 220 charges an external device.

The charging circuit 210 according to an embodiment of the disclosure may transmit the first overcurrent warning signal to the first logic circuit 230. The processor 120 according to an embodiment of the disclosure may receive a warning signal based on the first overcurrent warning signal and the reset warning signal from the first logic circuit 230. Accordingly, the processor 120 may prevent the overcurrent protection function or the SMPL reset function from being performed by at least one of the plurality of IP blocks included in the processor 120. In addition, the processor 120 may prevent the overcurrent protection function or the SMPL reset function from being performed by other modules outside the processor 120, such as the display module 160 or the power transmission module 220. In addition, the processor 120 may prevent the overcurrent protection function or the SMPL reset function from being performed in the electronic device 101 due to other factors.

A system on chip (SoC) including the processor 120 according to an embodiment of the disclosure may include a dedicated pin that receives a warning signal that is based on the first overcurrent warning signal received when the level of the entire current of the electronic device 101 is equal to or greater than the first threshold current and the reset warning signal received when the voltage level of the electronic device 101 is less than or equal to the second threshold voltage. The processor 120 may be configured to perform at least one of the reduction of the operation clock frequency of the CPU included in the processor 120, the reduction of the luminance of the display 160 controlled by the processor 120, or the reduction of the charging current of the power transmission module 220 controlled by the processor 120 according to the first overcurrent warning signal and the reset warning signal.

Figure 2B:
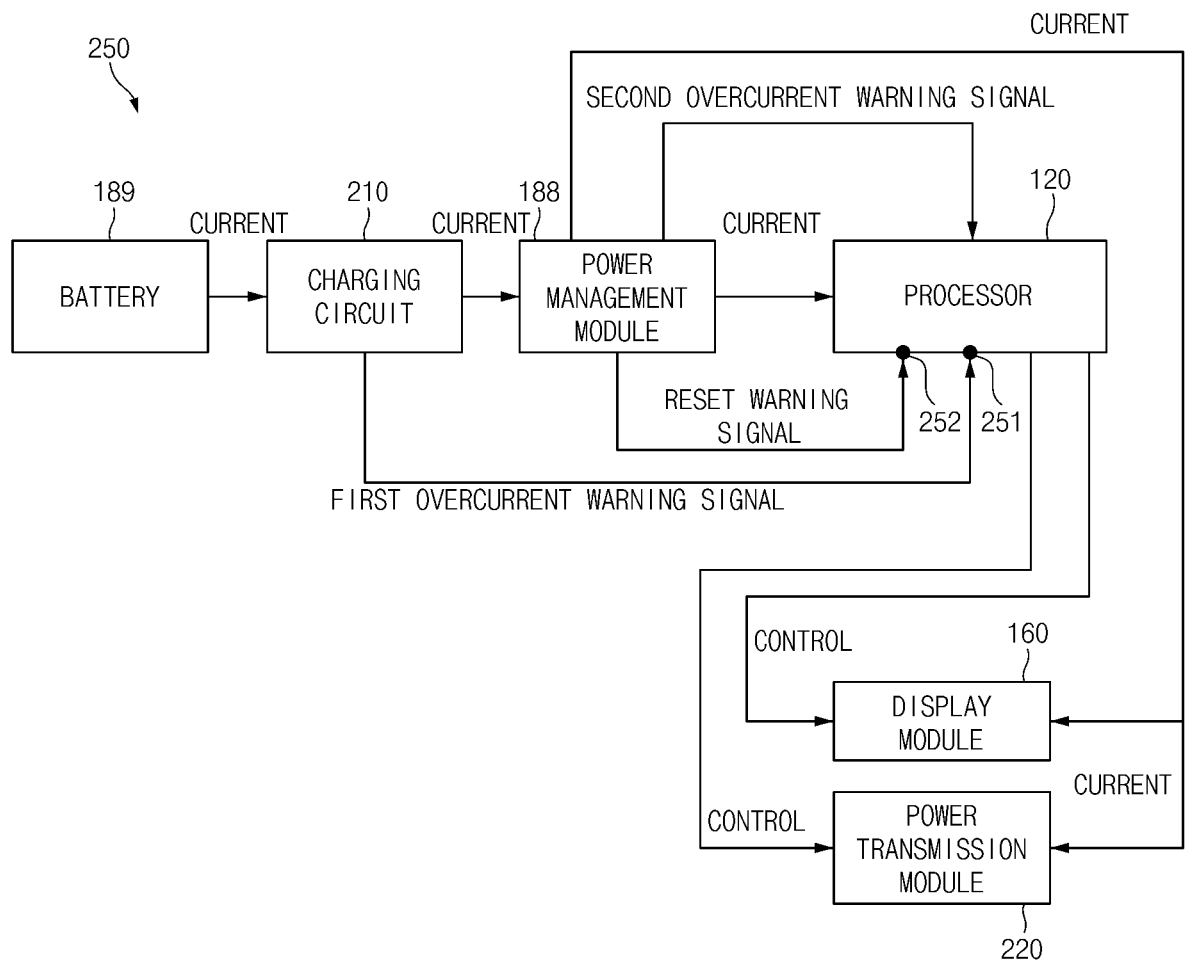
FIG. 2B is a block diagram illustrating an electronic device according to an embodiment of the disclosure.

FIG. 2B is a block diagram illustrating an electronic device (e.g., the electronic device 101 of FIG. 1) according to an embodiment of the disclosure.

Referring to FIG. 2B, the electronic device 101 may include the battery 189, the charging circuit 210, the power management module 188, and the processor 120. The battery 189, the charging circuit 210, and the power management module 188 of the electronic device 101 according to another embodiment may be substantially the same as the battery 189, the charging circuit 210, and the power management module 188 of the electronic device 101 according to the embodiment described with reference to FIG. 2A.

In the embodiment shown in FIG. 2B, the processor 120 may include a first general purpose input output (GPIO) pin 251 and a second GPIO pin 252. The processor 120 may receive the first overcurrent warning signal through the first GPIO pin 251. The processor 120 may receive the reset warning signal through the second GPIO pin 252.

The processor 120 may control the operation of at least one block among the plurality of IP blocks included in the processor 120 based on at least one of the first overcurrent warning signal and the reset warning signal. For example, when receiving the first overcurrent warning signal through the first GPIO pin 251, the processor 120 may control at least one of a plurality of operation clock frequencies set in each of the plurality of IP blocks.

The processor 120 may control the operation of the display module 160 based on at least one of the first overcurrent warning signal and the reset warning signal. For example, the processor 120 may reduce the luminance of the screen of the display module 160 when receiving the first overcurrent warning signal through the first GPIO pin 251. The processor 120 may control the operation of the power transmission module 220 based on at least one of the first overcurrent warning signal and the reset warning signal. For example, when receiving the first overcurrent warning signal through the first GPIO pin 251, the processor 120 may reduce the speed at which the power transmission module 220 charges an external device.

Figure 3A:
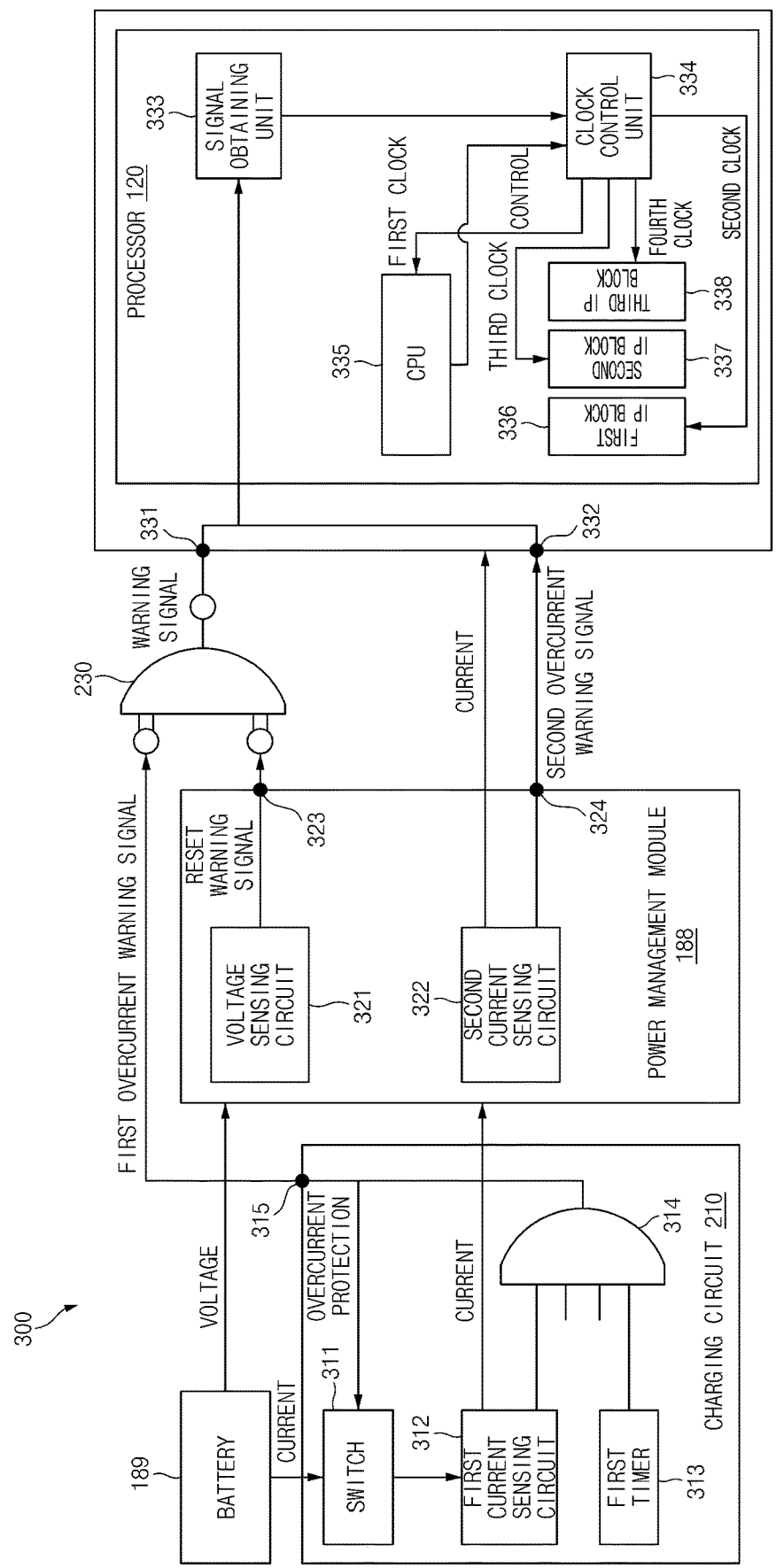
FIG. 3A is diagram illustrating a charging circuit, a power management module, a first logic circuit, and a processor of an electronic device according to an embodiment of the disclosure.

FIG. 3A is diagram illustrating the charging circuit 210, the power management module 188, the first logic circuit 230, and the processor 120 of an electronic device (e.g., the electronic device 101 of FIG. 1) according to an embodiment of the disclosure.

Referring to FIG. 3A, the charging circuit 210 may receive a current from the battery 189. The charging circuit 210 may transmit a current to the power management module 188. The charging circuit 210 may sense a current flowing throughout the electronic device 101. The charging circuit 210 may include a switch 311, a first current sensing circuit 312, a first timer 313, a second logic circuit 314, and a first pin 315.

The switch 311 may receive a current from the battery 189. The switch 311 may be a battery Q-point field effect transistor (QBAT FET) that is a field effect transistor that sets an operating point (Q-point) at which an operation of receiving a current from the battery 189 starts. The switch 311 may receive whether the overcurrent protection function is disabled or enabled through the first pin 315. The switch 311 may be in a closed state when the overcurrent protection function is disabled. The switch 311 may transmit the current received from the battery 189 to the first current sensing circuit 312 in the closed state. The switch 311 may be switched to an open state when the overcurrent protection function is enabled. The switch 311 may block the current flowing from the battery 189 in the open state.

The first current sensing circuit 312 may receive a current from the switch 311. The first current sensing circuit 312 may detect the magnitude of the current received from the switch 311. The first current sensing circuit 312 may transmit the current received from the switch 311 to the power management module 188. The first current sensing circuit 312 may transmit a first notification signal to the second logic circuit 314 when the magnitude of the current received from the switch 311 is greater than or equal to the first threshold current. The first threshold current may be about 6.2A.

The first timer 313 may measure the elapsed time. The first timer 313 may measure a time when the magnitude of the current received by the first current sensing circuit 312 is greater than or equal to the first threshold current. The first timer 313 may transmit a second notification signal to the second logic circuit 314 when the magnitude of the current received by the first current sensing circuit 312 is greater than or equal to the first threshold current for the first threshold time. The first threshold time may be about 100 ms. The first timer 313 may transmit a third notification signal to the second logic circuit 314 when the magnitude of the current received by the first current sensing circuit 312 is greater than or equal to the first threshold current for a second threshold time. The second threshold time may be about 3 ms.

The second logic circuit 314 may receive the first notification signal from the first current sensing circuit 312. The second logic circuit 314 may receive the second notification signal or the third notification signal from the first timer 313. The second logic circuit 314 may include a logic gate for processing the first notification signal and the second notification signal or the third notification signal together. For example, the second logic circuit 314 may be an AND gate. The second logic circuit 314 may perform an overcurrent protection function based on the first notification signal and the second notification signal. The second logic circuit 314 may generate a first overcurrent warning signal based on the first notification signal and the third notification signal.

The second logic circuit 314 may perform the overcurrent protection function based on the first notification signal and the second notification signal. The overcurrent protection function may be transmitted to the switch 311. For example, the second logic circuit 314 may perform the overcurrent protection function when both the first notification signal and the second notification signal received are enabled.

The second logic circuit 314 may transmit the first overcurrent warning signal based on the first notification signal and/or the third notification signal to the first pin 315. For example, the second logic circuit 314 may transmit the first overcurrent warning signal to the first pin 315 when both the first notification signal and the third notification signal received are enabled.

The second logic circuit 314 may be composed of a hardware circuit that transmits an active low signal to the first pin 315, which is a dedicated pin to connect between the charging circuit 210 and the processor 120.

The first pin 315 may receive the first overcurrent warning signal from the second logic circuit 314. The first pin 315 may receive the first overcurrent warning signal based on the first notification signal and/or the third notification signal. The first pin 315 may transmit the first overcurrent warning signal to the first logic circuit 230. The first pin 315 may be a pin dedicated to transmit a warning signal to the processor 120 when the current flowing throughout the electronic device 101 is equal to or greater than the first threshold current for the second threshold time shorter than the first threshold time during which the overcurrent protection function is performed. The first pin 315 may be a pin dedicated to transmit the first overcurrent warning signal to the first logic circuit 230 connected to the processor 120 when the current flowing throughout the electronic device 101 is equal to or greater than the first threshold current.

The power management module 188 may receive a voltage from the battery 189. The power management module 188 may receive a current from the charging circuit 210. The power management module 188 may transmit the voltages and current to the processor 120. The power management module 188 may control the voltage and current transmitted to the processor 120. In the embodiment shown in FIG. 3B, the power management module 188 includes a voltage sensing circuit 321, a second current sensing circuit 322, a second pin 323, and a third pin 324.

The voltage sensing circuit 321 may receive a voltage from the battery 189. The voltage sensing circuit 321 may generate a reset warning signal when the received voltage of the battery 189 is less than or equal to the second threshold voltage. The second threshold voltage may be higher than the first threshold voltage at which the SMPL reset function is performed. The reset warning signal may be a signal that prevents the SMPL reset function from being performed by notifying that the voltage of the battery 189 is approximate to the first threshold voltage at which the SMPL reset function is performed. The voltage sensing circuit 321 may transmit the reset warning signal to the first logic circuit 230 through the second pin 323.

The second current sensing circuit 322 may receive a current from the first current sensing circuit 312. The second current sensing circuit 322 may transmit the received current to the processor 120.

The second current sensing circuit 322 may generate the second overcurrent warning signal when the received current is greater than or equal to the first threshold current during the third threshold time. The first threshold current may be a value at which the overcurrent protection function is performed. The second overcurrent warning signal may be a signal that prevents the overcurrent protection function from being performed by notifying that the current flowing throughout the electronic device 101 has reached the first threshold current at which the overcurrent protection function is performed. The second current sensing circuit 322 may transmit the second overcurrent warning signal to the processor 120 through the third pin 324.

The second pin 323 may receive the reset warning signal from the voltage sensing circuit 321. The second pin 323 may transmit the reset warning signal to the first logic circuit 230.

The third pin 324 may receive the second overcurrent warning signal from the second current sensing circuit 322. The third pin 324 may transmit the second overcurrent warning signal to the processor 120.

The power management module 188 may include the second pin 323 that is a pin set to transmit, to the processor 120, a signal notifying that the voltage level of the electronic device 101 is equal to or less than the second threshold voltage. The power management module 188 may include the third pin 324 that is a pin set to transmit, to the processor 120, a signal notifying that the current flowing through the electronic device 101 is equal to or greater than the first threshold current.

The first logic circuit 230 may receive the first overcurrent warning signal from the charging circuit 210. The first logic circuit 230 may receive the first overcurrent warning signal from the first pin 315.

The first logic circuit 230 may receive the reset warning signal from the power management module 188. The first logic circuit 230 may receive the reset warning signal from the second pin 323.

The first logic circuit 230 may generate a warning signal based on the first overcurrent warning signal and the reset warning signal. For example, the first logic circuit 230 may generate the warning signal when at least one of the first overcurrent warning signal and the reset warning signal is enabled or active. The first logic circuit 230 may transmit the generated warning signal to the processor 120.

The processor 120 may obtain the warning signal from the first logic circuit 230. The processor 120 may obtain the second overcurrent warning signal from the power management module 188. The processor 120 may control the overall operation of the electronic device 101 based on the warning signal and the second overcurrent warning signal. The processor 120 may include at least one pin dedicated to receive a signal according to a current or voltage level from the charging circuit 210 and the power management module 188. The processor 120 according to an embodiment may include a fourth pin 331, a fifth pin 332, a signal obtaining unit 333, a clock control unit 334, and a central processing unit (CPU) 335, a first IP block 336, a second IP block 337, and a third IP block 338.

The fourth pin 331 may receive the warning signal from the first logic circuit 230. The fourth pin 331 may transmit the warning signal to the signal obtaining unit 333.

The fifth pin 332 may receive the second overcurrent warning signal from the power management module 188. The fifth pin 331 may receive the second overcurrent warning signal from the second current sensing circuit 332. The fifth pin 332 may transmit the second overcurrent warning signal to the signal obtaining unit 333.

The signal obtaining unit 333 may obtain the warning signal and/or the second overcurrent warning signal. The signal obtaining unit 333 may obtain the warning signal from the fourth pin 331. The signal obtaining unit 333 may obtain the second overcurrent warning signal from the fifth pin 332. The signal obtaining unit 333 may transmit a notification signal to the clock control unit 334 when receiving at least one of the warning signal and the second overcurrent warning signal.

The clock control unit 334 may control a clock signal supplied for the operation of the CPU 335, the first IP block 336, the second IP block 337, and/or the third IP block 338. The clock control unit 334 may set the clock signal supplied to the CPU 335 as a first clock. The clock control unit 334 may set a clock signal supplied to the first IP block 336 as a second clock. The clock control unit 334 may set a clock signal supplied to the second IP block 337 as a third clock. The clock control unit 334 may set a clock signal supplied to the third IP block 338 as a fourth clock.

The clock control unit 334 may receive a notification signal from the signal obtaining unit 333. When receiving the notification signal, the clock control unit 334 may control the operation clock frequency of the first clock, the operation clock frequency of the second clock, the operation clock frequency of the third clock, and/or the operation clock frequency of the fourth clock. The operation clock frequency may be an operation frequency value set through dynamic voltage frequency scaling (DVFS) among frequency ranges of the clock signal. The operation clock frequency may be an operation frequency value of a dynamic voltage frequency scaling policy applied to a CPU and/or block to which the clock signal is supplied. The operation clock frequency may be a frequency value set separately from the dynamic voltage frequency scaling itself.

The clock control unit 334 may be controlled by the CPU 335. Control of the clock control unit 334 may be performed through an interrupt handler of the CPU 335.

The clock control unit 334 may decrease the clock frequency of the first clock that is a clock signal supplied to the CPU 335 when receiving the notification signal. When receiving the notification signal, the clock control unit 334 may decrease the clock frequency of the first clock by a value stored in a register inside the processor 120 or by a set ratio. For example, the clock control unit 334 may reduce the clock frequency of the first clock by half when receiving the notification signal. For another example, when receiving the notification signal, the clock control unit 334 may decrease the clock frequency of the first clock to $1/3$, $2/3$, $1/4$, $3/4$, $1/5$, $2/5$, $3/5$, or $4/5$.

When receiving the notification signal, the clock control unit 334 may reduce at least one of operation clock frequencies of the second clock of the first IP block 336, the third clock of the second IP block 337, and the fourth clock of the third IP block 338.

The CPU 335 may control the clock control unit 334 by using an interrupt handler. The CPU 240 may set each of the plurality of operation clock frequencies through dynamic voltage frequency scaling. The CPU 335 may decrease at least one of the operation clock frequencies of the first clock of the CPU 335, the second clock of the first IP block 336, the third clock of the second IP block 337, and the fourth clock of the third IP block 338.

The CPU 335 may decrease at least one of the operation clock frequencies by a value stored in a register inside the processor 120 or a set ratio. For example, the CPU 335 may reduce at least one of the operation clock frequencies by half.

The CPU 335 may decrease the first clock of the CPU 335, the second clock of the first IP block 336, the third clock of the second IP block 337, and the fourth clock of the third IP block 338 such that the current flowing throughout the electronic device 101 and a voltage drop of the battery 189 may be reduced. The CPU 335 may reduce the current flowing throughout the electronic device 101 to keep the current flowing throughout the electronic device 101 lower than the first threshold current. The CPU 335 may maintain the voltage level of the battery 189 to be higher than the first threshold voltage by reducing the voltage drop of the battery 189. The CPU 335 may reduce the performance of the overcurrent protection function by maintaining the current flowing throughout the electronic device 101 lower than the first threshold current. The CPU 335 may reduce the performance of the SMPL reset function by maintaining the voltage level of the battery 189 higher than the first threshold voltage. Accordingly, a phenomenon in which the electronic device 101 is turned off by performing the overcurrent protection function and/or the SMPL reset function while the electronic device 101 is in use may be reduced. The phenomenon in which the electronic device 101 is turned off during use of the electronic device 101 may be reduced, thereby improving use stability of the electronic device 101.

The first IP block 336, the second IP block 337, and/or the third IP block 338 may be a circuit, an element, a module, and/or a bus that performs specified functions in the processor 120 configured as a system on chip (SOC). The first IP block 336 may be a graphic processing unit (GPU). The second IP block 337 may be a neural processing unit (NPU). The third IP block 338 may be a bus. The third IP block 338 (e.g., a bus) may include a group of signal lines for data communication. For example, the third IP block 338 may include at least one or a combination of two or more of an address bus, a data bus, and a control bus. However, the embodiment is not limited thereto, and the processor 120 may include a plurality of IP blocks such as a multimedia card (MMC) and/or universal flash storage (UFS).

Figure 3B:
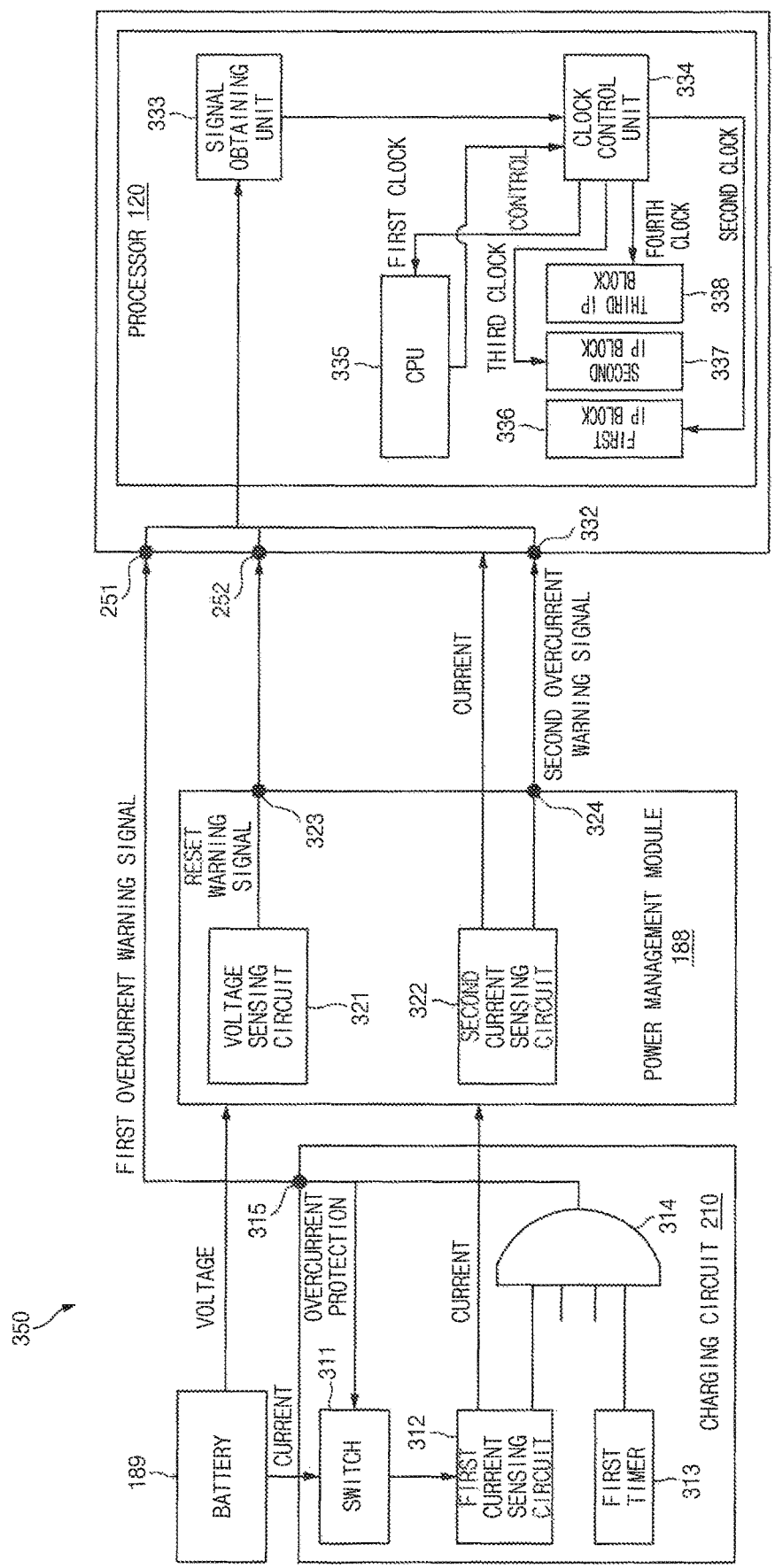
FIG. 3B is a diagram illustrating a charging circuit, a power management module, a first logic circuit, and a processor of an electronic device according to an embodiment of the disclosure.

FIG. 3B is a diagram 350 illustrating the charging circuit 210, the power management module 188, and the processor 120 of an electronic device (e.g., the electronic device 101 of FIG. 1) according to an embodiment of the disclosure.

Referring to FIG. 3B, the charging circuit 210 and the power management module 188 of the electronic device 101 may be substantially the same as the charging circuit 210 and the power management module 188 of the electronic device 101 according to the embodiment described with reference to FIG. 3A.

The processor 120 may include the first GPIO pin 251 and the second GPIO pin 252. The processor 120 may receive the first overcurrent warning signal from the first pin 315 of the charging circuit 210 through the first GPIO pin 251. The processor 120 may receive the reset warning signal from the second pin 323 of the power management module 188 through the second GPIO pin 252.

The processor 120 may control the operation of at least one among the plurality of IP blocks included in the processor 120 based on at least one of the first overcurrent warning signal and the reset warning signal. For example, the processor 120 may control at least one of a plurality of operation clock frequencies set in the CPU 335, the first IP block 336, the second IP block 337, and the third IP block 338 in response to receiving the first overcurrent warning signal by the signal obtaining unit 333 through the first GPIO pin 251.

Figure 4:
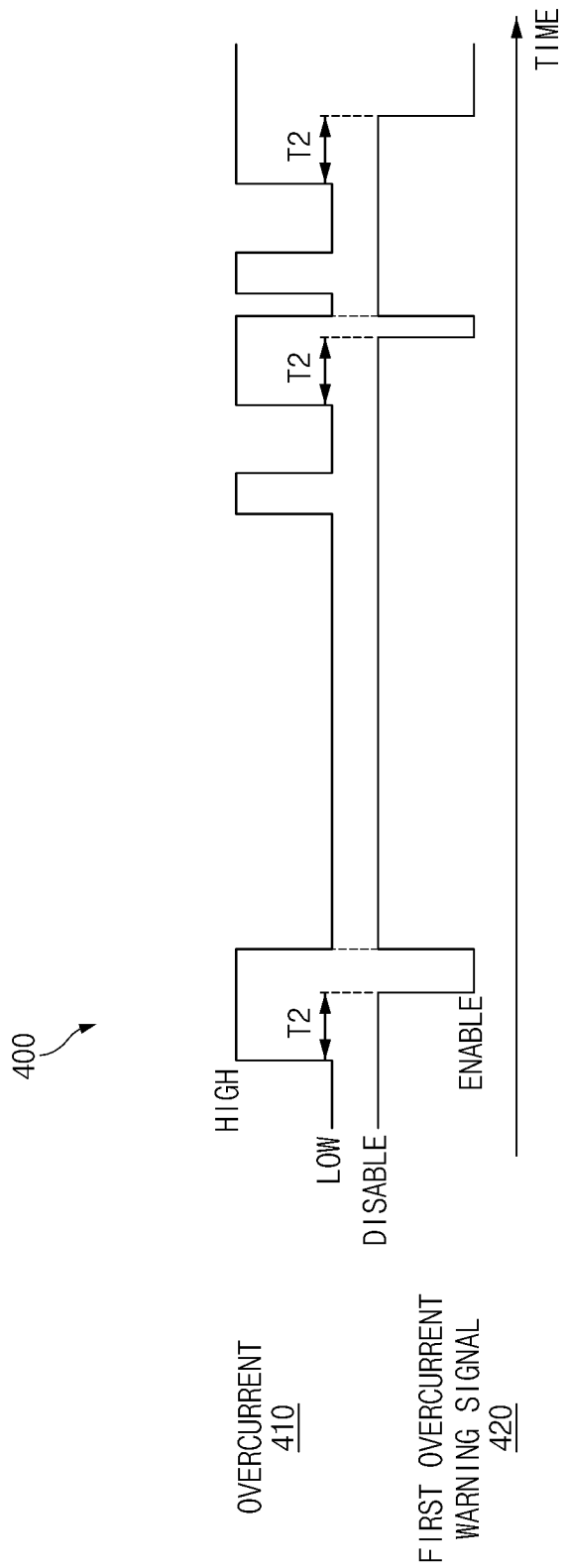
FIG. 4 is a waveform diagram illustrating an overcurrent and an overcurrent warning signal according to an embodiment of the disclosure.

FIG. 4 is a waveform diagram 400 illustrating an overcurrent and a first overcurrent warning signal according to an embodiment of the disclosure.

Referring to FIG. 4, when the overcurrent 410 is in a high (H) state, the current flowing through the electronic device 101 may be equal to or greater than the first threshold current. When the overcurrent 410 is in a low (L) state, the current flowing through the electronic device 101 may be less than or equal to the first threshold current.

When the first overcurrent warning signal 420 is in a disabled state, the first overcurrent warning signal may not be transmitted to the processor 120. When the first overcurrent warning signal 420 is in an enable state, the first overcurrent warning signal may be transferred to the processor 120.

When the overcurrent 410 remains in a high state for a second threshold time T2, the first overcurrent warning signal 420 may be switched to an enabled state. The second threshold time T2 may be shorter than the first threshold time during which the overcurrent protection function is performed. For example, the second threshold time may be about 3 ms.

The charging circuit 210 may output the first overcurrent warning signal to the power management module 188 when the total current flowing through the electronic device 101 is greater than or equal to the first threshold current for the second threshold time T2. The second threshold time T2 may be shorter than the first threshold time. Accordingly, the charging circuit 210 may quickly inform that the total current flowing through the electronic device 101 is greater than or equal to the first threshold current.

When the current of the entire electronic device 101 reaches the first threshold current at which the overcurrent protection function is performed, the charging circuit 210 may detect a case where the current is greater than or equal to the first threshold current during the second threshold time T1 before the first threshold time during which the overcurrent protection function is performed has elapsed. The charging circuit 210 may generate the first overcurrent warning signal and output the first overcurrent warning signal to a dedicated pin (e.g., the first pin 315 of FIGS. 3A and 3B). The charging circuit 210 may transmit the first overcurrent warning signal to the first logic circuit (e.g., the first logic circuit 230 of FIG. 3A) such that the first logic circuit 230 transmits the warning signal to the processor 120.

Figure 5A:
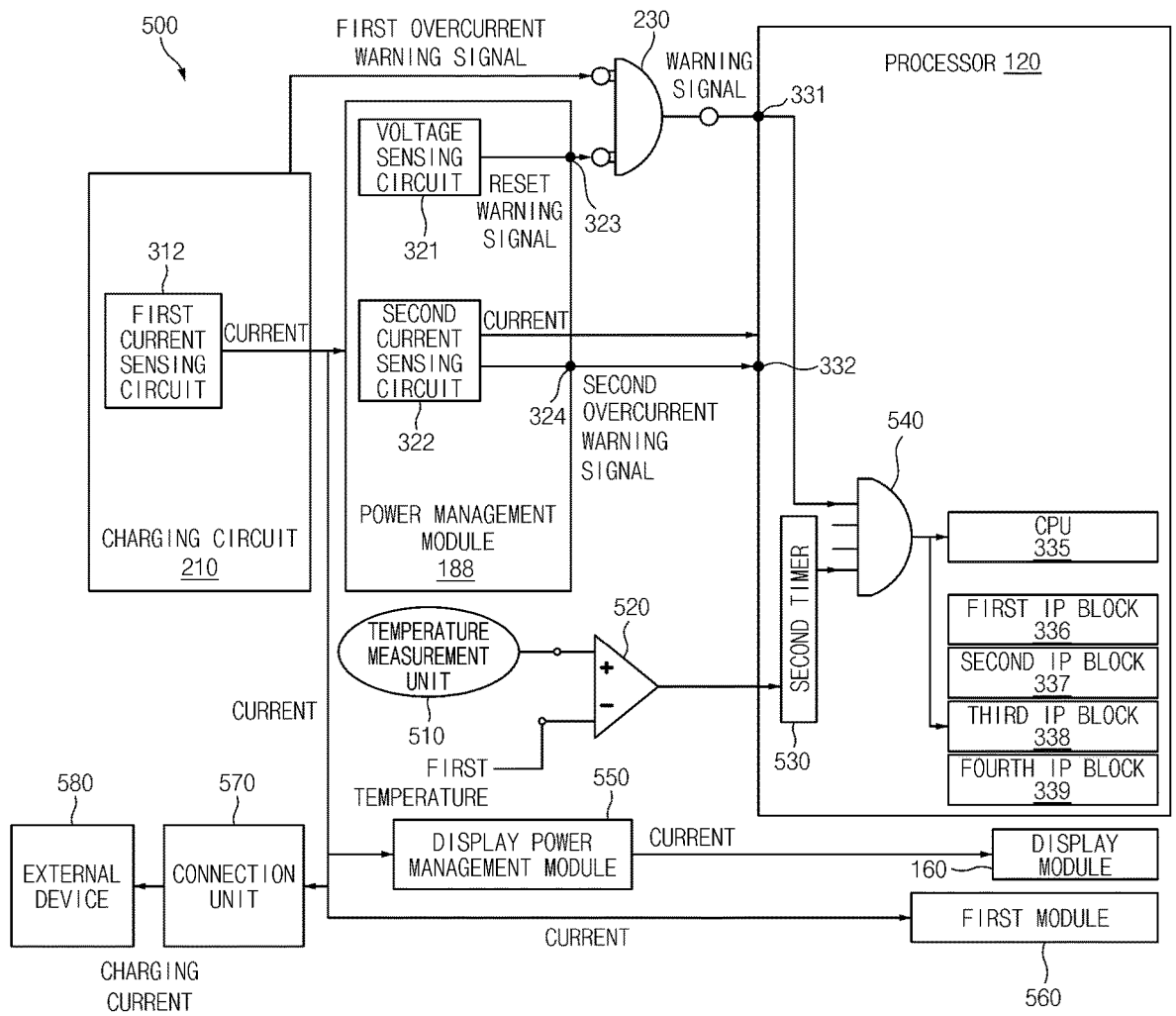
FIG. 5A is a block diagram illustrating an electronic device according to an embodiment of the disclosure.

FIG. 5A is a block diagram 500 illustrating an electronic device (e.g., the electronic device 101 of FIG. 1) according to an embodiment of the disclosure.

Referring to FIG. 5A, the electronic device 101 may include the charging circuit 210, the power management module 188, the first logic circuit 230, the processor 120, a display power management module 550, the display module 160, a first module 560, and a connection unit 570 connected to an external device 580.

The charging circuit 210 may transmit a current to the power management module 188. The first current sensing circuit 312 of the charging circuit 210 may transmit a current to the second current sensing circuit 322 of the power management module 188.

A temperature measurement unit 510 may be arranged inside the electronic device 101. The temperature measurement unit 510 may include a thermistor. The temperature measurement unit 510 may measure the internal temperature of the electronic device 101. The temperature measurement unit 510 may be arranged separately from the processor 120. The temperature measurement unit 510 may be arranged adjacent to the battery 189 or arranged on a surface of the battery 189. The temperature measurement unit 510 may measure the temperature of a battery (e.g., the battery 189 of FIGS. 3A and 3B). The temperature measurement unit 510 may measure the temperature around the battery 189. The temperature measurement unit 510 may transmit the measured temperature to a first operation circuit 520.

The first operation circuit 520 may receive the temperature inside the electronic device 101 and/or the temperature around the electronic device 101 measured by the temperature measurement unit 510. The first operation circuit 520 may compare the temperature measured by the temperature measurement unit 510 with a preset first temperature. The first operation circuit 520 may transmit a comparison result between the temperature measured by the temperature measurement unit 510 and the first temperature to the processor 120.

The first operation circuit 520 may set a period in which the temperature measurement unit 510 measures the internal temperature of the electronic device 101. The first operation circuit 520 may be disposed separately from the processor 120. However, embodiments of the disclosure are not limited thereto, and the first operation circuit 520 may be included in the processor 120. The first operation circuit 520 may transmit the set period to the processor 120.

The first operation circuit 520 may set a period according to the temperature measured by the temperature measurement unit 510. When the temperature measured by the temperature measurement unit 510 is equal to or higher than the first temperature, the first operation circuit 520 may determine the temperature as the room temperature state. When the temperature measured by the temperature measurement unit 510 is less than the first temperature, the first operation circuit 520 may determine the temperature as a low temperature state. The first operation circuit 520 may set the period to a first time in the room temperature state. The first operation circuit 520 may set the period to a second time in the low temperature state. The second time may be greater than the first time.

The processor 120 may receive a warning signal from the first logic circuit 230. The processor 120 may receive a comparison result of the measured temperature and the first temperature from the first operation circuit 520. The processor 120 may control the overall operation of the electronic device 101 based on the warning signal and the comparison result. The processor 120 may include the fourth pin 331, a second timer 530, a third logic circuit 540, the CPU 335, the first IP block 336, the second IP block 337, the third IP block 338, and a fourth IP block 339.

The fourth pin 331 may receive the warning signal from the first logic circuit 230. The fourth pin 331 may transmit the warning signal to the third logic circuit 540.

The second timer 530 may receive the comparison result from the first operation circuit 520. The second timer 530 may transmit the comparison result to the third logic circuit 540.

The third logic circuit 540 may receive the warning signal and the comparison result. The third logic circuit 540 may transmit a control signal to at least one of the CPU 335, the first IP block 336, the second IP block 337, the third IP block 338, and the fourth IP block 339 based on the comparison result and the warning signal. For example, the third logic circuit 540 may transmit the control signal to the CPU 335 and the third IP block 338 based on the comparison result and the warning signal.

The CPU 335 may receive the control signal from the third logic circuit 540. The CPU 335 may reduce the power and/or voltage consumed by at least one of the CPU 335, the first IP block 336, the second IP block 337, the third IP block 338, and the fourth IP block 339 based on the control signal. For example, the CPU 335 may reduce the operation clock frequency of at least one of the first IP block 336, the second IP block 337, the third IP block 338, and the fourth IP block 339 based on the control signal.

The charging circuit 210 may supply a current to the display power management module 550, the first module 560, and the connection unit 570.

The display power management module 550 may supply a current to the display module 160.

The first module 560 may be a module arranged inside the electronic device 101 to perform a function. For example, the first module 560 may be a communication circuit (e.g., the wireless communication module 192 of FIG. 1), a camera (e.g., the camera module 180 of FIG. 1), or a speaker (e.g., the audio output module 155 of FIG. 1). However, embodiments of the disclosure are not limited thereto, and the electronic device 101 may have various modules for performing various functions.

The connection unit 570 may be connected to the external device 580. The external device 580 may be another smart phone or wearable device. The connection unit 570 may supply a charging current to the external device 580. For example, the connection unit 570 may be a USB connector. For example, the connection unit 570 may be an on the go (OTG) connection device or a power sharing connection device. The connection unit 570 to the external device 580 may be included in a power transmission module (e.g., the power transmission module 220 of FIGS. 2A and 2B).

The processor 120 may control the current flowing through the display power management module 550, the first module 560, and/or the connection unit 570 based on the warning signal and the second overcurrent warning signal. When the warning signal or the second overcurrent warning signal is in an enable state, the processor 120 may control the charging circuit 210 to reduce the current flowing through the display power management module 550, the first module 560, and/or the connection unit 570.

When the warning signal or the second overcurrent warning signal is in an enable state, the processor 120 may be configured to reduce at least one of the luminance of the display module 160, the resolution of the camera 180, and the volume of the speaker 155. When the warning signal or the second overcurrent warning signal is in an enable state, the processor 120 may perform control to reduce the consumed current of the electronic device 101 to a first threshold current or less. The processor 120 may reduce the luminance of the display module 160 in order to reduce the consumed current of the electronic device 101 to less than or equal to the first threshold value. The processor 120 may reduce the resolution of the camera 180 in order to reduce the current consumption of the electronic device 101 to less than or equal to the first threshold current. The processor 120 may decrease the volume of the speaker 155 in order to reduce current consumption of the electronic device 101 to less than or equal to the first threshold current. The processor 120 may control the display 160, the camera 180, and/or the speaker 155 to reduce the consumed current of the electronic device 101 to less than or equal to the first threshold current so that the voltage of the battery 189 is kept to the first threshold voltage or above.

Figure 5B:
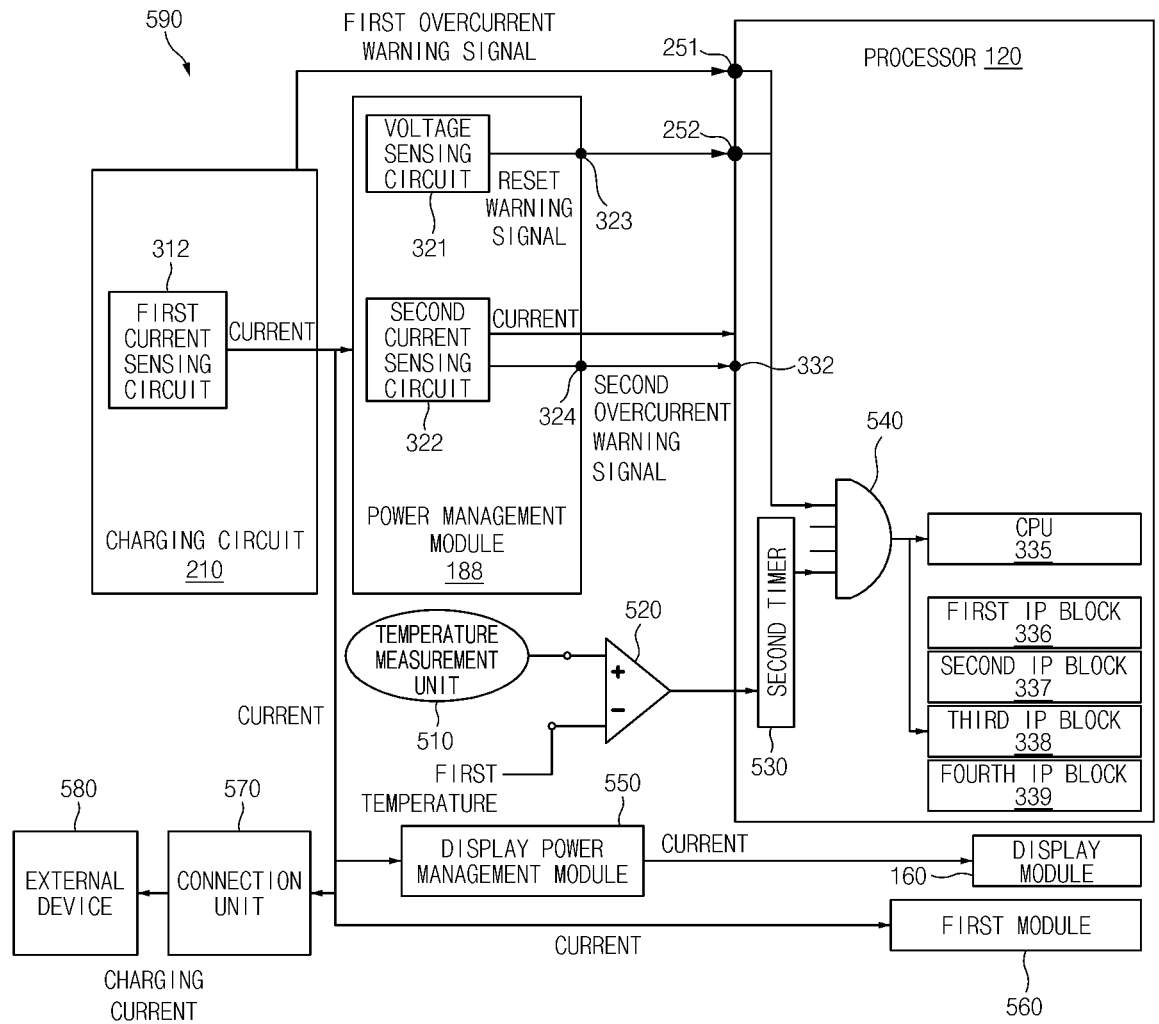
FIG. 5B is a block diagram illustrating an electronic device according to an embodiment of the disclosure.

FIG. 5B is a block diagram 590 illustrating an electronic device (e.g., the electronic device 101 of FIG. 1) according to an embodiment of the disclosure.

Referring to FIG. 5B, the electronic device 101 may include the charging circuit 210, the power management module 188, the processor 120, the display power management module 550, the display module 160, the first module 560, and the connection unit 570 connected to the external device 580. The charging circuit 210, the power management module 188, the display power management module 550, the display module 160, the first module 560, and the connection unit 570 of the electronic device 101 may be substantially the same as the charging circuit 210, the power management module 188, the display power management module 550, the display module 160, the first module 560, and the connection unit 570 of the electronic device 101 according to the embodiment described with reference to FIG. 5A.

The processor 120 may include the first GPIO pin 251 and the second GPIO pin 252. The processor 120 may receive the first overcurrent warning signal from the charging circuit 210 through the first GPIO pin 251. The processor 120 may receive a reset warning signal from the second pin 323 of the power management module 188 through the second GPIO pin 252.

The processor 120 may control the operation of at least one of the plurality of IP blocks included in the processor 120 based on at least one of the first overcurrent warning signal and the reset warning signal. For example, the processor 120 may control at least one of the operation clock frequencies set into each of the CPU 335, the first IP block 336, the second IP block 337, the third IP block 338, and the fourth IP block 339 in response to receiving the first overcurrent warning signal from the third logic circuit 540 through the first GPIO pin 251.

The processor 120 may control the current flowing through the display power management module 550, the first module 560, and/or the connection unit 570 based on at least one of the first overcurrent warning signal and the reset warning signal. For example, the processor 120 may reduce the luminance of the display module 160 in response to receiving the first overcurrent warning signal by the third logic circuit 540 through the first GPIO pin 251. As another example, the processor 120 may reduce the current flowing through the connection unit 570 in response to receiving the first overcurrent warning signal by the third logic circuit 540 through the first GPIO pin 251.

Figure 6:
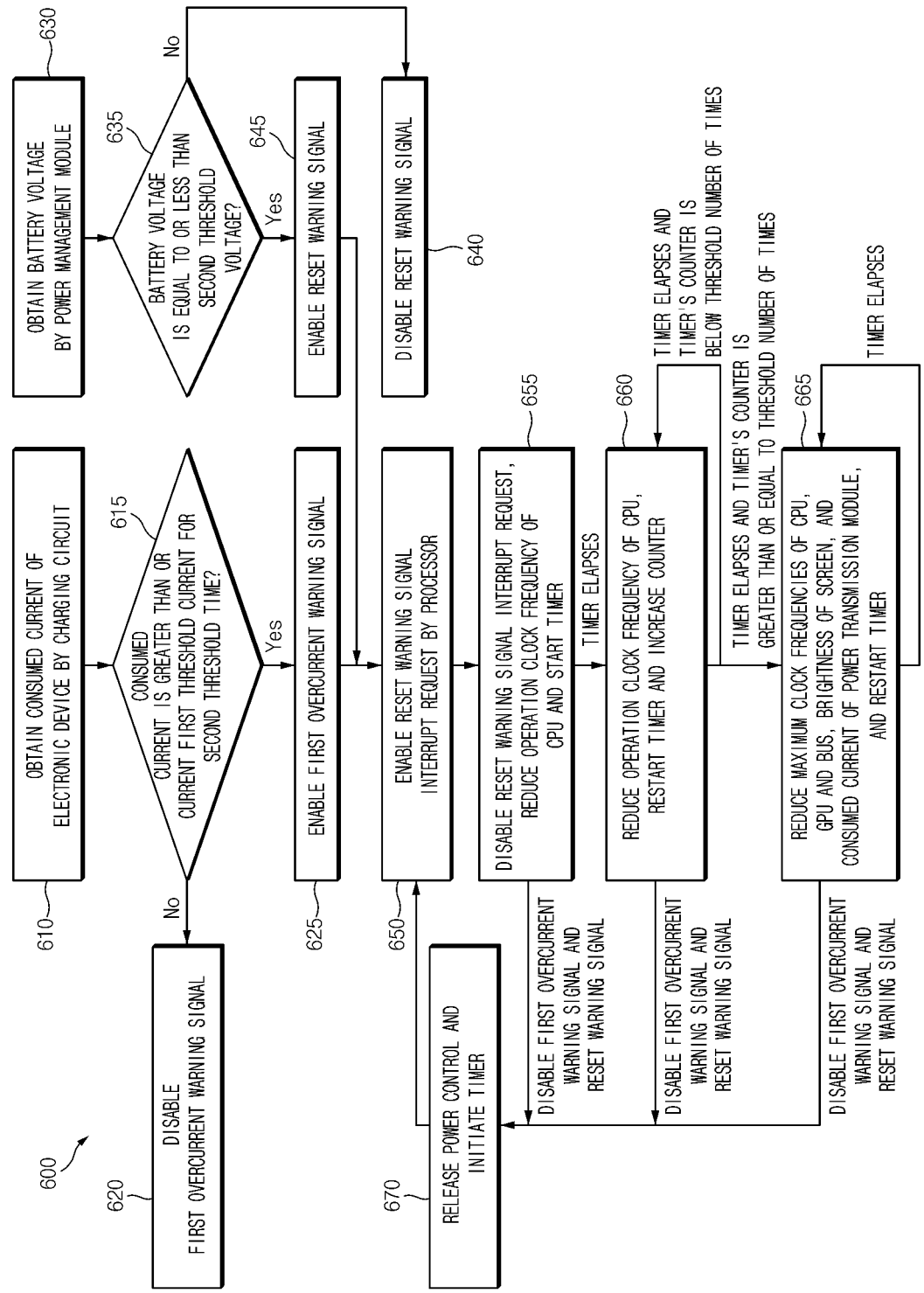
FIG. 6 is a flowchart illustrating a method of controlling an electronic device according to an embodiment of the disclosure.

FIG. 6 is a flowchart 600 illustrating a method of controlling an electronic device (e.g., the electronic device 101 of FIG. 1) according to an embodiment of the disclosure.

Referring to FIG. 6, in operation 610, the charging circuit (e.g., the charging circuit 210 of FIGS. 2A and 2B) of the electronic device 101 according to an embodiment may obtain the consumed current of the electronic device 101. The charging circuit 210 may monitor the total consumed current of the electronic device 101 including the supply current. The supply current may include a current for charging an external device (e.g., the external device 580 of FIGS. 5A and 5B) such as on the go.

In operation 615, the charging circuit 210 of the electronic device 101 according to an embodiment may determine whether the consumed current is greater than or equal to the first threshold current for the second threshold time. The charging circuit 210 may determine whether the consumed current is greater than or equal to the first threshold current for the second threshold time shorter than the first threshold time during which the overcurrent protection function is performed. The charging circuit 210 may proceed to operation 620 when the consumed current is less than the first threshold current (operation 615—No). The charging circuit 210 may proceed to operation 625 when the consumed current is greater than or equal to the first threshold current (operation 615—Yes).

In operation 620, the charging circuit 210 of the electronic device 101 may disable the first overcurrent warning signal. The charging circuit 210 may maintain the first overcurrent warning signal in a high state.

In operation 625, the charging circuit 210 of the electronic device 101 may enable the first overcurrent warning signal. The charging circuit 210 may change the first overcurrent warning signal to a low state.

In operation 630, the power management module (e.g., the power management module 188 of FIGS. 2A and 2B) of the electronic device 101 may obtain the voltage of a battery (e.g., the battery 189 of FIG. 1). The voltage of the battery 189 may be monitored by the power management module 188.

In operation 635, the power management module 188 of the electronic device 101 may determine whether the voltage of the battery 189 is equal to or less than the second threshold voltage. The power management module 188 may determine whether the voltage of the battery 189 is equal to or less than the second threshold voltage higher than the first threshold voltage at which the SMPL reset function is performed. The power management module 188 may proceed to operation 640 when the voltage of the battery 189 is greater than the second threshold voltage (operation 635—No). The power management module 188 may proceed to operation 645 when the voltage of the battery 189 is equal to or less than the second threshold voltage (operation 635—Yes).

In operation 640, the charging circuit 210 of the electronic device 101 may disable the reset warning signal. The charging circuit 210 may maintain the SMPL reset warning signal in a high state.

In operation 645, the charging circuit 210 of the electronic device 101 may enable the reset warning signal. The charging circuit 210 may change the SMPL reset warning signal to a low state.

In operation 650, the processor (e.g., the processor 120 of FIGS. 2A and 2B) of the electronic device 101 may enable the reset warning interrupt request. The processor 120 may enable the overcurrent warning IRQ signal. The processor 120 may perform control to prevent the reset operation from being performed.

In operation 655, the processor 120 of the electronic device 101 may disable the reset warning interrupt request, reduce the operation clock frequency of the CPU (e.g., the CPU 335 of FIGS. 3A and 3B), and start a timer (e.g., the second timer 530 of FIGS. 5A and 5B). The processor 120 may allow the operation of decreasing the operation clock frequency of the CPU 335 to be performed in a kernel layer.

In operation 655, the processor 120 of the electronic device 101 may proceed to operation 660 when the timer 530 passes a designated time period in operation 655. When the first overcurrent warning signal and the reset warning signal are disabled in operation 655, the processor 120 may proceed to operation 670.

In operation 660, the processor 120 of the electronic device 101 according to an embodiment may decrease the operation clock frequency of the CPU 335, and restart the timer 530 to increases the counter. When the timer 530 elapses a specified time period, the counter may increase the count by 1.

The processor 120 of the electronic device 101 may repeat operation 660 when the timer 530 elapses and the counter of the timer 530 is less than the threshold number of times in operation 660. When the timer 530 elapses in operation 660 and the counter of the timer 530 is equal to or greater than the threshold number of times, the processor 120 may proceed to operation 665. When the first overcurrent warning signal and the reset warning signal are disabled in operation 660, the processor 120 may proceed to operation 670.

In operation 665, the processor 120 of the electronic device 101 may reduce the maximum clock frequencies of the CPU 335, the GPU (e.g., the first IP block 336 of FIGS. 3A and 3B) and the bus (e.g., the third IP block 338 of FIGS. 3A and 3B), the brightness of the screen (e.g., the display module 160 of FIGS. 5A and 5B), and the consumed current of the power transmission module (e.g., the power transmission module 220 of FIGS. 2A and 2B), and restart the timer 530. The processor 120 may allow the operation of reducing the consumed current of the power transmission module 220 to be performed in the framework.

When the timer 530 elapses in operation 665, the processor 120 of the electronic device 101 may repeat operation 665. When the first overcurrent warning signal and the reset warning signal are disabled in operation 665, the processor 120 may proceed to operation 670.

The processor 120 of the electronic device 101 may release power control and initialize the timer 530 in operation 670.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a battery;
a charging circuit;
a power management module; and
a processor operationally connected to the battery and the charging circuit and including a central processing unit (CPU) and a plurality of intellectual property (IP) blocks,
wherein the charging circuit includes a first pin configured to output a first overcurrent warning signal when a value of current flowing through the electronic device is greater than or equal to a first threshold current,
wherein the power management module includes a second pin that is a dedicated pin to transmit a second overcurrent warning signal to the processor when the value of current flowing through the electronic device is greater than or equal to a second threshold current,
wherein the processor includes a first general purpose input output (GPIO) pin configured to receive the first overcurrent warning signal output from the first pin and a second GPIO pin configured to receive the second overcurrent warning signal output from the second pin, and
wherein, when at least one of the first overcurrent warning signal or the second overcurrent warning signal is received, the processor is configured to:
reduce at least one clock frequency among a plurality of clock frequencies set to the CPU and each of the plurality of IP blocks,
reduce luminance of a display controlled by the processor, or
reduce a charging current of a power transmission module controlled by the processor.

2. The electronic device of claim 1, wherein the processor is further configured to reduce luminance of the display when the first overcurrent warning signal or the second overcurrent warning signal is received.

3. The electronic device of claim 1,
wherein the processor is further configured to reduce the charging current of the power transmission module when the first overcurrent warning signal or the second overcurrent warning signal is received.

4. The electronic device of claim 1, wherein the processor is further configured to reduce at least one operation clock frequency among the plurality of clock frequencies based on at least one of the first overcurrent warning signal or the second overcurrent warning signal.

5. The electronic device of claim 1, wherein the processor is further configured to:
set each of the plurality of clock frequencies through dynamic voltage frequency scaling (DVFS); and
reduce at least one of a first operation clock frequency set in the CPU, a second operation clock frequency set in a graphic processing unit (GPU) among the plurality of IP blocks, a third operation clock frequency set in a neural processing unit (NPU) among the plurality of IP blocks, and a fourth operation clock frequency set in a bus among the plurality of IP blocks when the value of the current flowing through the electronic device after a first time elapses is greater than or equal to the first threshold current.

6. The electronic device of claim 1, wherein the processor is further configured to:
increase a counter of a timer inside the processor while decreasing the at least one clock frequency; and
decrease at least two operation clock frequencies among a first operation clock frequency, a second operation clock frequency, a third operation clock frequency, and a fourth operation clock frequency when the counter is equal to or greater than a specified threshold number of times.

7. The electronic device of claim 1, wherein the charging circuit is configured to output a signal through the first pin when the current is greater than or equal to the first threshold current for a second threshold time shorter than a first threshold time for which an overcurrent protection function is performed.

8. The electronic device of claim 1, wherein the power management module includes a third pin configured to output a reset warning signal when a voltage of the power management module is equal to or lower than a threshold voltage.

9. The electronic device of claim 8, wherein the reset warning signal is a signal that prevents a sudden momentary power loss (SMPL) reset function from being performed.

10. The electronic device of claim 1, wherein the processor further includes a fifth pin that is a dedicated pin to receive the second overcurrent warning signal from the power management module.

11. A system on chip comprising:
a processor,
wherein the processor includes a first general purpose input output (GPIO) pin configured to receive a first overcurrent warning signal when a current level of an entire electronic device is greater than or equal to a first threshold current and a second GPIO pin configured to receive a second overcurrent warning signal when the current level of an entire electronic device is greater than or equal to a second threshold current, and
wherein, based on at least one of the first overcurrent warning signal or the second overcurrent warning signal, the processor is configured to perform at least one of:
reducing a clock frequency of a central processing unit included in the processor,
reduce luminance of a display controlled by the processor, or
reduce a charging current of a power transmission module controlled by the processor.

12. The system on chip of claim 11, wherein the processor is further configured to reduce at least one operation clock frequency among a plurality of operation clock frequencies based on at least one of the first overcurrent warning signal or the second overcurrent warning signal.

13. The system on chip of claim 11,
wherein the processor includes a central processing unit (CPU) and a plurality of intellectual property (IP) blocks, and
wherein the processor is further configured to reduce an operation clock frequency of at least one of the CPU and the plurality of IP blocks according to the at least one of the first overcurrent warning signal or the second overcurrent warning signal.

14. The system on chip of claim 13, wherein the processor is further configured to reduce at least one of a first operation clock frequency set in the CPU, a second operation clock frequency set in a graphic processing unit among the plurality of IP blocks, a third operation clock frequency set in a neural processing unit among the plurality of IP blocks, and a fourth operation clock frequency set in a bus among the plurality of IP blocks.

15. The system on chip of claim 14, wherein the processor is further configured to:
increase a counter while decreasing the first operation clock frequency whenever a timer elapses, and
decrease the first operation clock frequency, the second operation clock frequency, the third operation clock frequency, and the fourth operation clock frequency when the counter is equal to or greater than a threshold number of times.

16. The system on chip of claim 11, wherein the processor further includes a third GPIO pin configured to receive a reset warning signal output from a power management module.

17. A method of controlling an electronic device, the method comprising:
outputting, by a charging circuit of the electronic device, a first overcurrent warning signal via a first pin when current consumed by the electronic device is greater than or equal to a first threshold current;
outputting, by a power management module of the electronic device, a second overcurrent warning signal via a second pin when a value of current flowing through the electronic device is greater than or equal to a second threshold current;
receiving, by a processor of the electronic device, at least one of the first overcurrent warning signal through a first general purpose input output (GPIO) pin included in the processor or the second overcurrent warning signal through a second GPIO pin included in the processor; and
reducing, by the processor, a clock frequency of a central processing unit included in the processor.

18. The method of claim 17, further comprising:
increasing a counter while decreasing at least one of maximum clock frequencies of a plurality of IP blocks whenever a timer elapses; and
reducing at least one of the maximum clock frequencies, luminance of a display, and a charging current of a power transmission module when the counter is equal to or greater than a threshold number of times.

19. The method of claim 17, wherein the reducing of the consumed current is performed by a framework of the processor.

20. The method of claim 17, further comprising:
releasing power control and initializing a timer when the first overcurrent warning signal is disabled.

* * * * *